Figure 1:
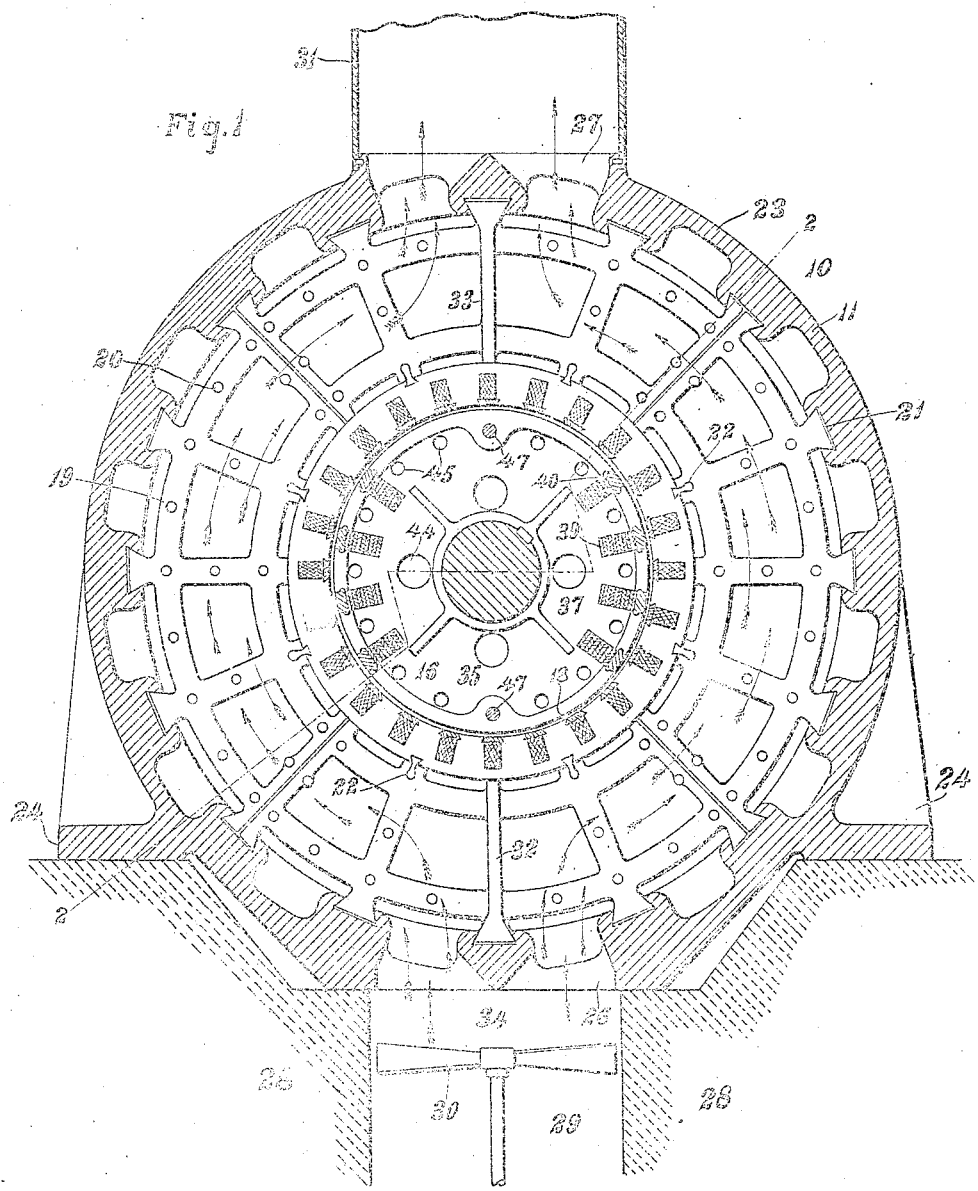

C. E. LORD.
DYNAMO ELECTRIC MACHINE.
APPLICATION FILED MAY 3, 1906.

922,924.

Patented May 25, 1909.
2 SHEETS—SHEET 1.

WITNESSES

INVENTOR
Chas. E. Lord

UNITED STATES PATENT OFFICE.

CHARLES E. LORD, OF NORWOOD, OHIO, ASSIGNOR TO ALLIS-CHALMERS COMPANY, A CORPORATION OF NEW JERSEY.

DYNAMO-ELECTRIC MACHINE.

No. 922,924.        Specification of Letters Patent.        Patented May 25, 1909.

Application filed May 3, 1906. Serial No. 314,920.

*To all whom it may concern:*

Be it known that I, CHARLES E. LORD, citizen of the United States, residing at Norwood, in the county of Hamilton and State of Ohio, have invented certain new and useful Improvements in Dynamo-Electric Machines, of which the following is a full, clear, and exact specification.

My invention relates to improvements in the construction of dynamo-electric machines, particularly high-speed turbo-generators and the means for ventilating same.

In the types of dynamo-electric machines most commonly employed at the present time, the rotary member or rotor is provided with connecting axial and circumferential passageways, and the stationary member or stator is provided with circumferential passageways through its core and between its windings. The passageways are so arranged that when the machine is in operation, the ventilating currents of air enter the rotor through said axial passageways, thence flow through the circumferential passageways of said member into the air-gap of the machine, thence through the passageways of the stator and out of the machine through openings in the periphery of its frame or yoke.

In high speed machines and particularly in turbo-generators, in which the rotor has a comparatively small diameter, it is practically impossible with the construction just described to force enough air across the air-gap to ventilate the machine, or to ventilate properly the core and windings of the stator. Furthermore with such a construction when the machine is run at high speeds the air flowing at an extremely high velocity through the passageways of the machine, and the streams of air flowing from the circumferential passageways of the rotor and impinging upon the windings and other projecting portions of the stator produce a very disagreeable and extremely objectionable noise.

The object of my invention is to so construct a dynamo-electric machine and arrange the ventilating passageways therethrough, that sufficient air to ventilate all parts properly may be readily supplied to the machine and the noise due to the flow of air may be reduced to a minimum. With these ends in view I provide the core of the stator with circumferential passageways concentric with the axis of the machine, which passageways I close at the inner periphery, and in the frame I provide inlet and outlet openings for a cooling medium, such as air, which openings communicate with the circumferential passageways whereby a large volume of the cooling medium can be caused to circulate through the core independently of the rotor and without passing through or entering the air gap of the machine.

In the preferred form of my invention I close the circumferential passageways of the stator with laminated paramagnetic material, such as iron, so that there will be a more uniform distribution of flux, and I cool the stator with a forced circulation of air. I also prefer to close the circumferential passageways of the rotor core with magnetic or other material and to provide some means such as suitably arranged axial air passageways communicating with the circumferential passageways for causing the air to circulate through the rotor, so that neither the air that passes through the stator, nor the air that passes through the rotor, enters the air-gap, and as the contiguous surfaces of the stator and rotor are comparatively smooth and unbroken the noise incident to high speed is practically eliminated.

My invention consists in the details of construction and combinations of parts described in the specification and set forth in the appended claims.

For a better understanding of my invention, reference is had to the accompanying drawings in which—

Figure 2:
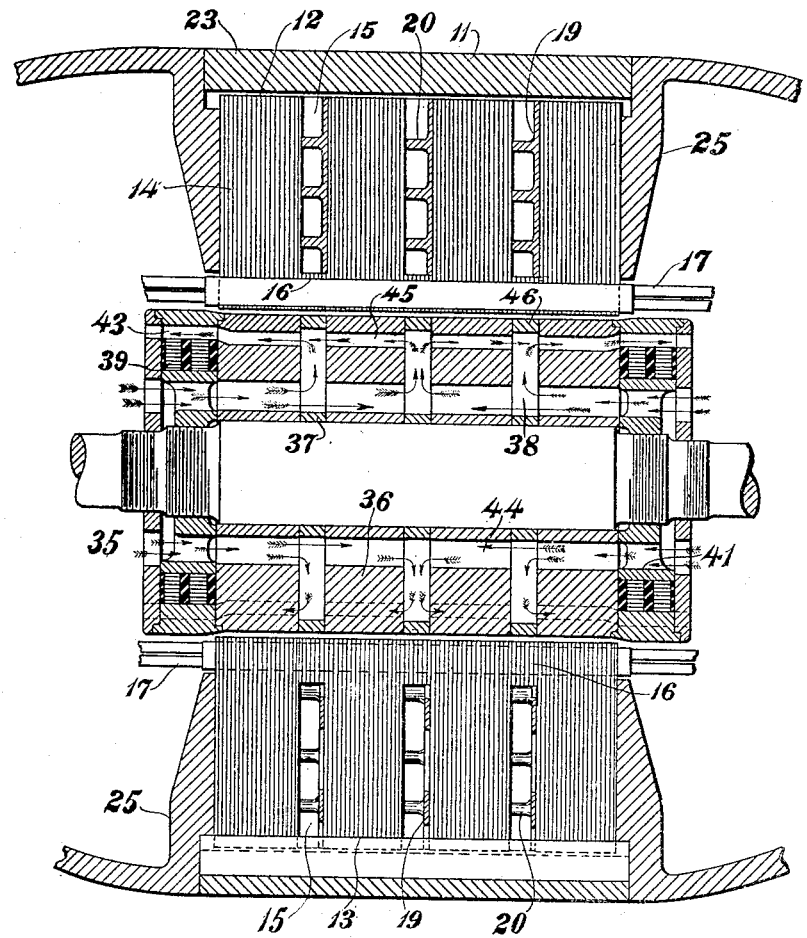

Figure 1 is a vertical section through the machine; and Fig. 2 is a section along the irregular line 2—2 of Fig. 1.

Referring now to the figures of the drawing, I have shown at 10 the stator, which is, in this case, a stationary armature. The stator frame 11 supports the laminated core 12 preferably by dove-tail connections 13. The core consists chiefly of the main laminæ 14 which are spaced apart to form the circumferential ventilating passageways 15. Instead of the passageways being open at the inner periphery of the core as in the usual construction so that air from the rotor can readily pass into the stator, I close or block up the passageways at the periphery of the core. In this case, I have shown laminæ 16 used for this purpose. I prefer to employ laminæ of paramagnetic material, as iron, in order that the flux may be more evenly distributed at the surface of the core so that the flux density in the laminæ 14 will be less and the iron losses diminished. The laminæ 16 have the same inner diameter as the laminæ 14 so that the surface of the core in an axial direction is unbroken or uninterrupted. These laminæ 16 are in this case built up of segments but in small machines they may each consist of continuous ring punchings. It is seen that the core consists of alternately arranged groups of laminæ having a long outer diameter and short diameter. Both the laminæ 14 and laminæ 16 are provided with slots for the reception of the armature coils 17, which are held in place by the wedges 18 of non-magnetic material. The outer diameter of the laminæ 16 is preferably such that they extend only a slight distance beyond the bottom of the slots so that the circumferential ventilating passageways are as deep as possible and extend nearly to the coils. The groups of laminæ 14 are spaced apart by the laminæ 16 and also by separators or ventilating segments 19 located beyond the laminæ 16. The separators 19 are segmental frames having lateral lugs 20 which are so constructed as to interfere as little as possible with the circulation of air. The separators are preferably held in position by dove-tail projections 21 which engage the frame. The separators are also provided with dove-tail projections 22 which engage suitable grooves in the laminæ 16 and thereby position and support the latter before the coils 17 and wedges 18 are put into place.

The frame 11 surrounding and supporting the core 12, consists of the yoke 23 provided with feet or pedestals 24 and combined end-heads and end-bells 25. The frame is provided at the bottom with an air-inlet opening 26 and at the top with an air-outlet opening 27. If necessary more than one inlet and more than one outlet opening can be provided. I have in this case shown the air inlet and outlet openings on diametrically opposite sides of the frame, and so located that there will be a good natural circulation of air. The frame is seated on a cement or concrete base or foundation 28, over an air-passageway 29 which may be connected to any convenient source of air-supply, as a fan or blower. In this case I have shown, somewhat conveniently, a source of air-supply at 30. Mounted on the top and secured thereto is a pipe or chimney 31 for conducting away the heated air and for increasing the natural draft. Under some circumstances the natural draft alone may be relied on for cooling the stator. The air inlet opening 26 is located directly over the air-passageway 29, and the frame so rests on the foundation that all the air passes up through said opening into the core. Radial barriers 32 and 33 are located opposite the air-inlet and outlet openings so that the air will divide at 34 and pass upward through the core equally in parallel paths on both sides of the rotor as is indicated by the arrows. It is thus seen that a large volume of air can be caused to circulate through the stationary core independently of the rotor. It is seen also that the circumferential passageways 15 are entirely closed except at the bottom and top of the frame so that no air can escape into the air-gap of the machine. I have shown the air-outlet opening at the top of the frame, but if desired it may be located at any other position relative to the inlet opening, for example it may be located at the side of the inlet opening at the bottom of the frame and the air will then travel entirely around the core before being allowed to escape.

The rotor, which is in this case the field-member, is shown at 35. The rotor consists of disks or sections 36, which are spaced apart preferably by ventilating members 37, forming circumferential ventilating passageways 38. The field-coils shown at 39, are held in position by wedges 40. The end-turns of the coils are supported by end-collars 41 on the shaft, and are surrounded by steel rings 42 provided with ventilating openings 43. The rotor is provided with large axial ventilating passageways 44 adjacent the shaft for the admission of air, and with smaller but a greater number of axial air-passages 45 more remote from the shaft and near the periphery of the rotor for the escape of the air. All the axial passageways communicate with the circumferential passageways 38. The axial passageways are open at both ends of the machine and the axial passageways 45 communicate with the ventilating openings 43 in the end-ring. In order that no air may pass from the circumferential passageways 38 to the air-gap I close the passageways 38 at the periphery of the core by rings 46 which are held in position by bolts 47 passing from end to end of the rotor. I prefer to make the rings 46 of paramagnetic material such as steel so that there will be a more uniform distribution of flux across the air gap. It is seen that when the field member is rotated at high speed a large volume of air is drawn into the core through the inlet-passageways 44 and after passing through the circumferential passageways 38 escapes by the outlet-passageways 45 and ventilating openings 43.

As a result of my novel construction both the rotor and stator are well cooled without any air passing into the air gap of the machine. By employing magnetic material for closing the circumferential passageways the flux is distributed more evenly along the cores and is less dense in the magnetic material between the passageways, resulting in less iron losses. By excluding the air from the air gap the chief cause of the disagreeable noise resulting from high speed of rotation is removed. I do not wish to confine myself to the use of air for cooling the stator, as some other cooling medium such as oil can be employed.

It is evident that many modifications can be made in the details of construction and arrangement of the passageways without departing from the spirit and scope of my invention, and I aim in my claims to cover all such modifications.

What I claim as new and desire to secure by Letters Patent is:—

1. In a dynamo-electric machine, a stator having parallel ventilating openings concentric with the axis of the machine, and means having a good magnetic conductivity for closing or blocking the openings at the inner periphery of the core.

2. In a dynamo-electric machine, a stator having parallel ventilating openings concentric with the axis of the machine, and means comprising strips or laminæ of magnetic material for closing or blocking the openings at the inner periphery of the core.

3. In a dynamo-electric machine, a stator consisting of laminæ arranged in groups, the groups being spaced apart forming circumferential ventilating passageways, and means for closing or blocking the passageways comprising laminated magnetic material.

4. In a dynamo-electric machine, a stator consisting of laminæ of magnetic material, some of said laminæ having a less outer diameter than others, whereby circumferential ventilating passageways closed at the inner periphery of the core are provided.

5. In a dynamo-electric machine, a stator comprising alternately arranged groups of laminæ of large outer diameter, and short outer diameter, whereby parallel circumferential air passageways are formed in the interior of the core.

6. In a dynamo-electric machine, a stator, comprising alternately arranged groups of iron-laminæ of large outer diameter and short outer diameter, said groups being arranged side-by-side and all said laminæ having the same inner diameter, whereby circumferential ventilating passages are formed in the core without interrupting the inner surface of the core.

7. In a dynamo-electric machine, a stator comprising alternately arranged groups of iron-laminæ of large outer diameter and short outer diameter, said groups being arranged side-by-side, and all said laminæ having the same inner diameter, whereby circumferential air-passageways are formed in the core without interrupting the inner surface of the core, and a frame surrounding the laminæ, said frame having air-inlet and air-outlet openings communicating with said passageways.

8. In a dynamo-electric machine, a stator comprising a group of iron-laminæ spaced apart forming circumferential ventilating air-passageways, means for closing the passageways at the inner surface of the core comprising iron-laminæ having the same inner diameter as the first mentioned laminæ but extending a short distance only from the inner periphery of the core, a frame surrounding the core, said frame having an air-inlet opening and an air-outlet opening, and means for forcing air through the parallel air-passageways in the core.

9. In a dynamo-electric machine, a rotor comprising a core having axial and circumferential ventilating passageways, said circumferential ventilating passageways being closed at the outer periphery of the core by magnetic material forming part of the core.

10. In a dynamo-electric machine, a rotor comprising a core divided into sections which are spaced apart forming circumferential ventilating passageways, said core having axial passageways communicating with the circumferential passageways, and means independent of the rotor windings for closing the circumferential passageways at the outer periphery of the core.

11. In a dynamo-electric machine, a rotor comprising a core divided into sections which are spaced apart forming circumferential air-passageways, paramagnetic means for closing the circumferential passageways at the outer periphery of the core, said core having formed therethrough a series of axial air-inlet openings and air-outlet openings.

12. In a dynamo-electric machine, a rotor having circumferential air-passageways closed at the outer periphery independently of the rotor windings, and axial air inlet and outlet passageways communicating with said circumferential passageways.

13. In a dynamo-electric machine, a rotor comprising a shaft, a core having circumferential air-passageways closed by magnetic material at the outer periphery of the core, and having axial air-passageways adjacent the shaft and axial air-passageways more remote from the shaft, all said axial passageways communicating with the circumferential passageways.

14. In a dynamo-electric machine, a rotor comprising a shaft, a core having circumferential air-passageways closed at the outer periphery of the core by magnetic material, axial air-passageways adjacent the shaft and axial air-passageways near the periphery of the core, and means for causing a circulation of air from the first named axial passageways adjacent the shaft into the circumferential passageways and out of the core by the axial passageways adjacent the periphery of the core.

15. In a dynamo-electric machine, a rotor having circumferential air-passageways closed by magnetic material at the outer periphery and air-inlet and air-outlet openings for said circumferential passageways, and a stator having circumferential passageways in the core closed by magnetic material at the inner periphery, and air-inlet and air-outlet openings communicating with said circumferential passageways.

16. In a dynamo-electric machine, a core comprising laminæ arranged in groups, and means for spacing said laminæ apart comprising separators in the body of the core and laminæ at the periphery of the core, said last named laminæ completely closing or blocking the spaces between the groups of laminæ.

17. In a dynamo-electric machine, a stationary member comprising a frame, laminæ supported by said frame, ventilating spacing or separating members between groups of laminæ forming ventilating passageways, and laminated means for closing the passageways at the inner periphery of the core, said laminated means being positioned by said spacing or separating members.

18. In a dynamo-electric machine, a stationary member comprising a frame, a laminated core having ventilating segments forming circumferential ventilating passageways, the laminæ of said core and ventilating segments being supported by said frame, laminated means for closing the passageways at the inner periphery of the core, and means associated with said ventilating segments for positioning the laminæ of said closing means.

In testimony whereof I affix my signature, in the presence of two witnesses.

CHARLES E. LORD.

Witnesses:
ARTHUR F. KWIS,
FRED J. KINSEY.